United States Patent [19]

Boutni

[11] Patent Number: 4,918,125
[45] Date of Patent: Apr. 17, 1990

[54] FLAME RETARDANT CARBONATE POLYMER BLENDS

[75] Inventor: Omar M. Boutni, Mt. Vernon, Ind.

[73] Assignee: General Electric Company, Mt. Vernon, Ind.

[21] Appl. No.: 289,935

[22] Filed: Dec. 27, 1988

[51] Int. Cl.$^4$ .............................................. C08K 5/42
[52] U.S. Cl. ..................................... 524/165; 524/281
[58] Field of Search .................. 525/67, 147; 524/161, 524/162, 163, 164, 165, 167, 281

[56] References Cited

U.S. PATENT DOCUMENTS

| 3,775,367 | 11/1973 | Nouvertné | 260/45.9 |
| 3,852,393 | 3/1974 | Furukzawa et al. | 260/873 |
| 3,855,277 | 12/1974 | Fox | 525/147 |
| 3,909,490 | 9/1975 | Mark | 260/45.7 |
| 3,915,926 | 10/1975 | Wambach | 524/411 |
| 3,926,908 | 12/1975 | Mark | 260/45.70 S |
| 3,933,734 | 1/1976 | Mark | 260/45.70 S |
| 3,940,366 | 2/1976 | Mark | 260/45.90 R |
| 3,947,524 | 3/1976 | Hozumi et al. | 525/67 |
| 3,948,851 | 4/1976 | Mark | 260/45.8 RW |
| 4,092,291 | 5/1978 | Mark | 524/163 |
| 4,110,299 | 8/1978 | Mark | 524/166 |
| 4,222,910 | 9/1980 | Tokuda | 525/147 |
| 4,263,201 | 4/1981 | Mark et al. | 260/45.7 SO |
| 4,438,231 | 3/1984 | Liu | 524/161 |
| 4,526,926 | 7/1985 | Weber et al. | 525/146 |
| 4,532,283 | 7/1985 | Liu | 524/166 |
| 4,552,911 | 11/1985 | Cohnen et al. | 524/166 |
| 4,751,260 | 6/1988 | Kress et al. | 524/130 |
| 4,786,686 | 11/1988 | Laughner et al. | 525/67 |

*Primary Examiner*—Veronica P. Hoke
*Attorney, Agent, or Firm*—Martin B. Barancik; Joseph T. Eisele

[57] ABSTRACT

Polycarbonate blends with a VO rating by underwriters laboratory Bulletin 94 (UL-94), together with good strength and processing characteristics are obtained by blending an aromatic carbonate polymer, an ABS copolymer, a tetrabromobisphenol A polycarbonate and a flame retardant sulfonate salt.

4 Claims, No Drawings

FLAME RETARDANT CARBONATE POLYMER BLENDS

BACKGROUND OF THE INVENTION

The invention is directed to blends of aromatic carbonate polymers with ABS and specific combinations of flame retardant additives, such blends having flame retardancy with nondripping characteristics, together with good strength properties.

BRIEF DESCRIPTION OF THE PRIOR ART

It has long been known that ABS thermoplastics can be blended with carbonate polymers to make useful thermoplastic blends. However, to achieve commercially useful combinations of properties has required extensive experimentation and many such combinations are deficient in one or more important properties.

One problem with polycarbonate-ABS blends is that, while polycarbonates themselves are flame retarded by certain sulfonate salt additives which are effective in very small amounts, these additives have essentially no flame retardant action on ABS, and are by themselves, rather poor as flame retardants in polycarbonate-ABS blends.

Conversely, ABS can be flame retarded by itself with a number of brominated additives, but generally to achieve high levels of flame retardancy and to avoid flaming drips, it has been necessary to use additional flame retardant ingredients such as antimony oxide and polytetrafluoroethylene. Such solid additives, when used in blends of polycarbonate and ABS, have deleterious effects on physical strength properties, in particular on the impact strength in thick sections, on the weldline strength in articles molded with multiple mold gates, and on the ease of processing.

Consequently, flame retarding blends of polycarbonates with ABS without losing desirable properties is difficult, despite the fact that flame retardant polycarbonates and blends with certain other resins has been achieved. Methods used for polycarbonates and certain blends are represented by Mark et al., U.S. Pat. No. 4,263,201 (1981), Ishihara, U.S. Pat. No. 4,735,978 (1988), and by Liu, U.S. Pat. No. 4,438,231 (1984), as well as references cited therein. It is noteworthy that Liu (loc. cit.) teaches the necessity for addition of tetrafluoroethylene to his blends to prevent flaming drip, even though Liu utilizes several but not all of the components of the present invention.

A further special problem with polycarbonate-ABS blends is that they tend to be very glossy. For many applications, such as business machine housings and some automotive parts, a dull (matte or nonglossy) surface is desirable. Applicant has found certain preferred ABS compositions which are advantageous in lowering gloss in carbonate-ABS blends and one feature of the present invention has as its object the flame retarding of such low gloss carbonate-ABS blends.

Applicant has found surprisingly that good flame retardancy without flaming drip, exemplified by a VO rating by Underwriters Laboratory Bulletin 94 (UL-94), together with good weldline strength, and good impact strength can be obtained with blends which comprise an aromatic carbonate polymer, an acrylonitrile-butadienestyrene (ABS) polymer (especially a high rubber ABS made by emulsion polymerization, such ABS being preferred for low gloss blends), and an effective flame retardant combination of a tetrabromobisphenol A polycarbonate and a flame retardant sulfonate salt. In contrast to the findings of Liu (loc. cit.), the addition of tetrafluoroethylene to these compositions is not necessary to prevent flaming drip, a finding which was unexpected.

DETAILED DESCRIPTION OF THE INVENTION

The compositions of the invention comprise:

(a) an aromatic carbonate polymer, preferably a polycarbonate, present in the range of about 65% to about 95% (preferably about 70% to about 90%);

(b) an ABS copolymer, preferably having at least 34% rubber content and preferably made by emulsion polymerization, said ABS copolymer being present in the range of about 5% to about 35% (preferably about 10% to about 30%);

(c) a tetrabromobisphenol A polycarbonate in the range of about 2 phr to about 20 phr (preferably about 5 phr to about 15 phr); and (d) a flame retardant sulfonate salt, preferably of an alkali metal, in the range of about 0.1 phr to about 4 phr (preferably about 0.2 phr to about 2 phr).

All percentages referred to herein are by weight unless otherwise specified. The term "phr" refers to parts of additive by weight per 100 parts by weight of resin, the resin in this case being the total of the carbonate (a) and the ABS (b).

Blends of this composition exhibit flame retardancy with nondripping characteristics, high weldline strength, and good strength properties. The blends of this composition made from the preferred high-rubber emulsion polymerized ABS also have desirable low gloss characteristics.

The aromatic carbonate polymers useful as component (a) include polycarbonates as well as polyestercarbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controller pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

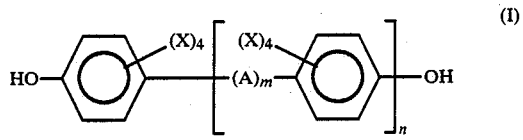
(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—; —S(=O)—; —S(=O)$_2$—; —O—; or —C(=O)—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

typical of some of the dihydric phenols that can be employed in the practice of the present invention are bis-phenols such as (4-hydroxyphenol)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyester-polycarbonates, polycarbonates, i.e., resins which contain, in addition to recurring polycarbonate chain unis of the formula:

(IIa)

wherein D is a divalent aromatic radical of the dihydric phenol employed in the polymerization reaction, repeating or recurring carboxylate units, for example of the formula:

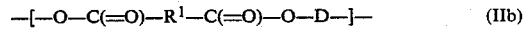
(IIb)

wherein D is as defined above and R$^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

(III)

wherein R$^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

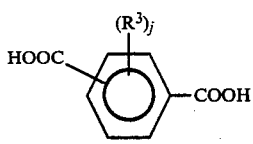
(IV)

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. Patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of 0.3 to 1.0 deciliters per gram measured in methylene chloride at 25° C.

The ABS polymer for use as component (b) in the blends of the invention is, most broadly, any ABS as defined under this term, for example, in the Modern Plastics Encyclopedia, 1989 edition, page 92, as the family of thermoplastics made from the three monomers acrylonitrile, butadiene and styrene, and more specifically as a mixture (alloy) of styrene-acrylonitrile copolymer with SAN-grafted polybutadiene rubber.

The preferred ABS polymer of high rubber content for use as component (b) is an ABS having greater than 32% rubber content and made by emulsion polymerization, rather than by bulk or suspension polymerization which are processes frequently used to manufacture commercial ABS; an ABS made by emulsion polymerization is exemplified in U.S. Pat. No. 2,820,773 (1958) which is incorporated by reference. ABS resins made by emulsion polymerization and having high rubber content are commercially available, for example the following: Novalar made by Nova Polymers, Inc.: a powdered ABS having about 41% butadiene rubber content, a density of 1.04 and a melt flow index of 4.0; and Blendex 301 made by Borg-Warner Chemicals, Inc.: a powdered ABS having about 34% polybutadiene rubber content, a specific gravity of 0.99 by ASTM D-792 Method A-1, and a heat deflection temperature of 172° C. at 10 mil deflection and 264 psi (annealed) by ASTM D-648.These two ABS products are most preferred for use in the blends of the invention.

The tetrabromobisphenol polycarbonate (c) can be any of the homopolycarbonates made from tetrabromobisphenol A and phosgene or the copolycarbonates made using partly tetrabromobisphenol A and partly bisphenol A. The homopolycarbonates are available for example from Great Lakes Chemical Corp. as BC-52 and BC-58; BC-52 is an oligomer of tetrabromobisphenol A polycarbonate with phenoxy end groups on the chain; BC-58 is similar but with 2,4,6-tribromophenoxy end groups on the chain. The copolymers of tetrabromobisphenol A and tetrabromobisphenol A are described and their preparation given by Womback, U.S. Pat. No. 3,915,926.

The preferred tetrabromobisphenol A polycarbonate is one having about 50% tetrabromobisphenol A and 50% bisphenol A units on a molar basis.

Component (d) is a flame retardant sulfonate salt such as those described in U.S. Pat. No. 3,775,367 assigned to Bayer or the aromatic sulfonate salts such as those described in U.S. Pat. Nos. 3,940,366, 3,933,734, 3,948,851, 3,926,908, and 3,909,490 assigned to General Electric Company. The preferred salts are the alkali metal salts.

The prefluoroalkylsulfonate salt of an alkali metal can be any of these disclosed by Nouvertne, U.S. Pat. No. 3,775,367 (1973) or by Liu (loc. cit.). Thus for example they can be the sodium or potassium salts of trifluoromethanesulfonic acid, nonafluorobutane-1-sulfonic acid, heptadecafluorooctanesulfonic acid, or the like. The preferred salt of this class is potassium nonafluorobutane-1-sulfonate.

The blends of the invention may be further modified by the addition of other types of additives known to the art of plastics compounding. Such additives can include fillers (such as clay or talc), reinforcing agents (such as glass fibers), impact modifiers, other resins, antistats, plasticizers, flow promoters and other processing aids, stabilizers, colorants, mold release agents, flame retardants, ultraviolet screening agents, and the like.

The production of the compositions of the invention is done by any of the blending operations known for the blending of thermoplastics, such as blending in a kneading machine such as a Banbury mixer or an extruder, or solvent blending. The sequence of addition is not critical but all four components (a)-(d) should be thoroughly blended together. Blending can be done continuously or batchwise.

The invention will be better understood with reference to the following examples, which are presented for purposes of illustration rather than for limitation, and which set forth the best mode contemplated for carrying out the invention.

EXAMPLE

Molding compositions were prepared by melt blending the ingredients indicated in the table below in a twin screw extruder at 220°–270° C. and 100–200 rpm. the blended and extruded material was then pelletized, dried and injection molded at about 240° to prepare test specimens. The gloss was measured by ASTM method D-1003 at 60° using a Gardner gloss meter. Other physical properties were measured on injection molded samples using the following ASTM test methods: Tensile properties, D638; impact by notched Izod, D256; heat deflection temperature (DTUL), D648-56; flexural properties, D790. Flammability was tested by the UL-94 method of Underwriters' Laboratory.

| Example No.: | 1 | 2 | 3 |
|---|---|---|---|
| Composition (wt. %): | | | |
| Polycarbonate[1] | 90 | 90 | 90 |
| Novalar ® ABS[2] | 10 | 10 | 10 |
| TB-50[3] (phr) | 10 | 10 | 10 |
| CF3(CF2)3SO3K[4] (phr) | 1 | — | — |
| Cl3C6H2SO3Na[5] (phr) | — | — | 1 |
| K sulfonesulfonate[6] | — | 1 | — |
| Properties: | | | |
| 60° gloss | 86 | 80 | 82 |
| Tensile yield, Kpsi | 8.8 | 8.7 | 8.4 |
| Tensile yield, MPa | 60.7 | 60 | 57.9 |
| Tensile break, Kpsi | 10.0 | 9.3 | 7.6 |
| Tensile break, MPa | 69 | 64 | 52 |
| Elongation, % | 87 | 97 | 64 |
| Flex. Yield, Kpsi | 13.2 | 13.0 | 12.8 |
| Flex. Yield, MPa | 91 | 89.7 | 88.3 |
| Flex. Modulus, Kpsi | 33 | 33 | 33 |
| Flex. Modulus, MPa | 227 | 227 | 227 |
| ⅛" N. Izod ft lb/in | 13.5 | 13.7 | 11.9 |
| 3.175 mm Izod J/m | 721 | 731 | 635 |
| ¼" N. Izod ftlb/in | 10.8 | 11.9 | 5.6 |
| 6.35 mm Izod J/m | 577 | 635 | 299 |
| Weldline strength ft lb | 10.6 | 22.9 | 16.3 |
| Weldline strength Kg.m | 1.46 | 3.16 | 2.25 |
| Kasha Index[7] | 2720 | 2890 | 2490 |
| UL-94 Flammability at ⅛" (3.175 mm) | V0 | V0 | V0 |

Notes to table:
[1] Lexan polycarbonate 145 made by General Electric Co.; a polycarbonate made from bisphenol A and phosgene.
[2] A powdered ABS made using emulsion polymerization by Nova Polymers, Inc., having about 41% butadiene rubber content, a density of 1.04 and a melt flow index of 4.0.
[3] Tetrabromobisphenol A/bisphenol A 50:50 copolycarbonate, a flame retardant polymeric additive made by General Electric Co.
[4] Potassium nonafluorobutanesulfonate, a commercially available compound made by 3M Co.
[5] Sodium 2,4,5-trichlorobenzenesulfonate, as in U.S. Pat. No. 3,940,366.
[6] The potassium salt of sulfonated diphenylsulfone as in U.S. Pat. No. 3,948,851.
[7] A measure of melt viscosity, method described in U.S. Pat. No. 4,735,978; results reported in Centiseconds, measured at 6 min and 300° C.

COMPARATIVE EXAMPLES 1–6

Various blends were prepared and tested having the individual flame retardants rather than combinations of the flame retardants. The blending and testing methods were as in the preceding example.

| Example No.: | 1 | 2 | 3 | 4 | 5 | 6 |
|---|---|---|---|---|---|---|
| Composition (wt. %): | | | | | | |
| Polycarbonate[1] | 95 | 90 | 90 | 90 | 90 | 90 |
| Blendex ® 301[2a] | — | — | — | — | 10 | 10 |
| Novalar ® ABS[2] | 5 | 10 | 10 | 10 | — | — |
| TB-50[3] (phr) | — | 20 | — | — | — | — |
| CF3(CF2)3SO3K[4] (phr) | 4 | — | — | — | — | — |
| Cl3C6H2SO3Na[5] (phr) | — | — | 4 | — | — | — |
| K sulfonesulfonate[6] | — | — | — | 4 | — | — |
| Properties: | | | | | | |
| ⅛" N/Izod ft lb/in | 15.0 | 14.7 | 10.3 | 14.1 | 9.3 | 13.2 |
| 3.175 mm Izod J/m | 801 | 785 | 550 | 753 | 497 | 705 |
| ¼" N/Izod ft lb/in | 9.7 | 11.9 | 11.2 | 10.8 | 4.8 | 11.3 |
| 6.35 mm Izod J/m | 518 | 635 | 598 | 577 | 256 | 603 |
| Weldline str. ft lb | 24.6 | 16.7 | 9.9 | n/d | 13.1 | 15.5 |
| Weldline str. Kg.m | 3.39 | 2.30 | 1.37 | n/d | 1.81 | 2.14 |
| Kasha Index[7] | 3170 | 3450 | 2540 | 2890 | 2800 | 3220 |
| UL-94 test at ⅛" (3.175 mm) | V1 | V1 | V1 | B | V1 | B |

Notes to table:
Footnotes are the same as in the preceding table except as follows:
[2a] Blendex ® 301 is a powdered ABS, made by Borg-Warner Chemicals Co., Inc., having about 34% polybutadiene rubber content and believed to be made by emulsion polymerization.
Kasha Index[7] determined at 6 min./300° C.

What is claimed is:

1. A flame retardant low-gloss thermoplastic blend, which, without the addition of polytetrafluoroethylene, exhibits no flaming drip in the UL-94 flammability test, which comprises:
    (a) an aromatic polycarbonate, present in the range of about 70% to about 90%;
    (b) an ABS copolymer having at least 34% rubber content and made by emulsion polymerization, said ABS copolymer being present in the range of about 10% to about 30%;
    (c) a tetrabromobisphenol A polycarbonate in the range of about 5 phr to about 15 phr; and
    (d) a perfluoroalkylsulfonate salt of an alkali metal in the range of about 0.2 phr to about 2 phr.

2. The thermoplastic blend defined in claim 1 wherein said polycarbonate is derived principally from bisphenol A and phosgene.

3. The thermoplastic blend defined in claim 1 where said tetrabromobisphenol A polycarbonate is an approximately 50:50 by weight copolymer from tetrabromobisphenol A and bisphenol A.

4. The thermoplastic blend defined in claim 1 where said perfluoroalkylsulfonate salt is potassium nonafluorobutanesulfonate.

* * * * *

UNITED STATES PATENT AND TRADEMARK OFFICE
CERTIFICATE OF CORRECTION

PATENT NO. : 4,918,125

DATED : April 17, 1990

INVENTOR(S) : Omar Mohamed Boutni

It is certified that error appears in the above-identified patent and that said Letters Patent is hereby corrected as shown below:

Col. 2, line 54
Delete "controller" and add "controlled"

Col. 4, line 29
Delete the second "polycarbonates"

Col. 6, line 49
Delete "172°C" and add "172°F"

Signed and Sealed this

Twenty-third Day of April, 1991

Attest:

HARRY F. MANBECK, JR.

Attesting Officer

Commissioner of Patents and Trademarks